US011828171B2

(12) United States Patent
Lim Chen Ning et al.

(10) Patent No.: US 11,828,171 B2
(45) Date of Patent: Nov. 28, 2023

(54) SYSTEM AND METHOD FOR PREVENTING WELLBORE INTERACTIONS

(71) Applicant: Chevron U.S.A. Inc., San Ramon, CA (US)

(72) Inventors: Ivan Lim Chen Ning, Houston, TX (US); Tamas Nemeth, Palo Alto, CA (US); David C. Bartel, Houston, TX (US); Zhishuai Zhang, Houston, TX (US); Yunhui Tan, Houston, TX (US); Joseph P. Stefani, San Ramon, CA (US); James P. DiSiena, Houston, TX (US); Dimitri Bevc, Houston, TX (US); Kelly Hughes, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 92 days.

(21) Appl. No.: 17/200,677

(22) Filed: Mar. 12, 2021

(65) Prior Publication Data

US 2022/0290559 A1 Sep. 15, 2022

Related U.S. Application Data

(60) Provisional application No. 62/991,538, filed on Mar. 18, 2020.

(51) Int. Cl.
*E21B 43/26* (2006.01)
*E21B 47/135* (2012.01)
*E21B 47/107* (2012.01)
*E21B 49/00* (2006.01)
(Continued)

(52) U.S. Cl.
CPC ............ *E21B 47/135* (2020.05); *E21B 43/26* (2013.01); *E21B 47/107* (2020.05); *E21B 49/008* (2013.01); *G06N 3/04* (2013.01); *G06N 20/00* (2019.01)

(58) Field of Classification Search
CPC ...................................... E21B 43/26
See application file for complete search history.

(56) References Cited

U.S. PATENT DOCUMENTS 10,287,874 B2    5/2019  Jin et al.
2013/0298665 A1* 11/2013  Minchau ............. E21B 43/26
                                            73/152.51

(Continued)

FOREIGN PATENT DOCUMENTS

WO    2018204920 A1    11/2018
WO    2020040829 A1    2/2020

OTHER PUBLICATIONS

Ayantayo Ajani, et al., "Interference Study in Shale Plays," SPE Hydraulic Fracturing Technology Conference, 2012, Society of Petroleum Engineers.

(Continued)

*Primary Examiner* — Giovanna Wright
(74) *Attorney, Agent, or Firm* — Marie L. Clapp

(57) ABSTRACT

A method is described for predicting and preventing wellbore interactions at wells that are near the injection well. The method includes receiving fiber optics data; performing object detection by detecting object-like events in the fiber optic data; and sending instructions to a hydraulic fracturing system based on the object detection. The method is executed by a computer system.

14 Claims, 5 Drawing Sheets

(51) Int. Cl.
   *G06N 20/00* (2019.01)
   *G06N 3/04* (2023.01)

(56) References Cited

U.S. PATENT DOCUMENTS

| | | | | |
|---|---|---|---|---|
| 2014/0278316 | A1* | 9/2014 | Dusterhoft | E21B 43/26 703/10 |
| 2017/0260854 | A1* | 9/2017 | Jin | G01V 1/226 |
| 2019/0120044 | A1* | 4/2019 | Langnes | G01V 1/001 |
| 2019/0120047 | A1 | 4/2019 | Jin | |
| 2019/0258883 | A1* | 8/2019 | Britto Mattos Lima | G06V 20/182 |
| 2020/0309982 | A1* | 10/2020 | Jin | G06F 17/18 |
| 2021/0131254 | A1* | 5/2021 | Potty | C09K 8/80 |
| 2021/0189874 | A1* | 6/2021 | Jaaskelainen | E21B 47/135 |
| 2021/0285323 | A1* | 9/2021 | Davis | G01V 99/005 |
| 2021/0389173 | A1* | 12/2021 | Mazrooee | E21B 47/135 |
| 2022/0010675 | A1* | 1/2022 | Yin | G06V 10/20 |

OTHER PUBLICATIONS

Robert Hull, et al., "Monitoring Horizontal Well Hydraulic Stimulations and Geomechanical Deformation Processes in the Unconventional Shales of the Midland Basin Using Fiber-Based Time-Lapse VSPs, Microseismic, and Strain Data," The Leading Edge, Feb. 2019, pp. 130-137.

Masaru Ichikawa, et al., "Case Study of Hydraulic Fracture Monitoring Using Low-Frequency Components of DAS Data," 89th Annual International Meeting, 2019, Society of Exploration Geophysicists, pp. 948-952.

Ge Jin, et al., "Hydraulic-Fracture Geometry Characterization Using Low-Frequency DAS Signal," The Leading Edge, Dec. 2017, pp. 975-980.

Ge Jin, et al., "Machine Learning-Based Fracture-Hit Detection Algorithm Using LFDAS Signal," The Leading Edge, Jul. 2019, pp. 520-524.

Zefeng Li, et al., "Pushing the Limit of Earthquake Detection with Distributed Acoustic Sensing and Template Matching: a Case Study at the Brady Geothermal Field," Geophysical Journal International, 2018, 215, pp. 1583-1593.

Joseph Redmon, et al., "You Only Look Once: Unified, Real-Time Object Detection," Proceedings of the IEEE Conference on Computer Vision and Pattern Recognition (CVPR), 2016, pp. 779-788.

P. Richter, et al., "Hydraulic Fracture Monitoring and Optimization in Unconventional Completions Using a High-Resolution Engineered Fibre-Optic Distributed Acoustic Sensor," First Break, Apr. 2019, vol. 37, pp. 63-68.

Florence Sagnard, et al., "Template-Matching Based Detection of Hyperbolas in Ground-Penetrating Radargrams for Buried Utilities," Journal of Geophysics and Engineering 13 (4), 2016, pp. 491-504.

Robert J. Skoumal, et al., "Distinguishing Induced Seismicity from Natural Seismicity in Ohio: Demonstrating the Utility of Waveform Template Matching," Journal of Geophysical Research: Solid Earth 120 (9), Sep. 12, 2015, AGU Publications, pp. 6284-6296.

Hao Sun, et al., "Understanding the Mechanism of Fracture Hits on Midland Basin Tight-Oil Production," Unconventional Resources Technology Conference. Society of Exploration Geophysicists, American Association of Petroleum Geologists, and Society of Petroleum Engineers, URTeC 2017, pp. 108-118.

Gustavo A. Ugueto, et al., "Can You Feel the Strain? DAS Strain Fronts for Fracture Geometry in the BC Montney, Groundbirch," SPE Annual Technical Conference and Exhibition, Society of Petroleum Engineers, 2019, 15 pgs.

Horne S. et al., "Machine Learning For DAS Microseismic Event Detection", 81st Eage Conference and Exhibition 2019 Workshop Programme, Jun. 6, 2019 (Jun. 6, 2019), p. 1-5, XP055807999; DOI: 10.3997/2214-4609.201901972.

PCT International Search Report dated Jun. 9, 2021 issued in Application No. PCT/IB2021/052068, filed on Mar. 12, 2021, 10 pages.

* cited by examiner

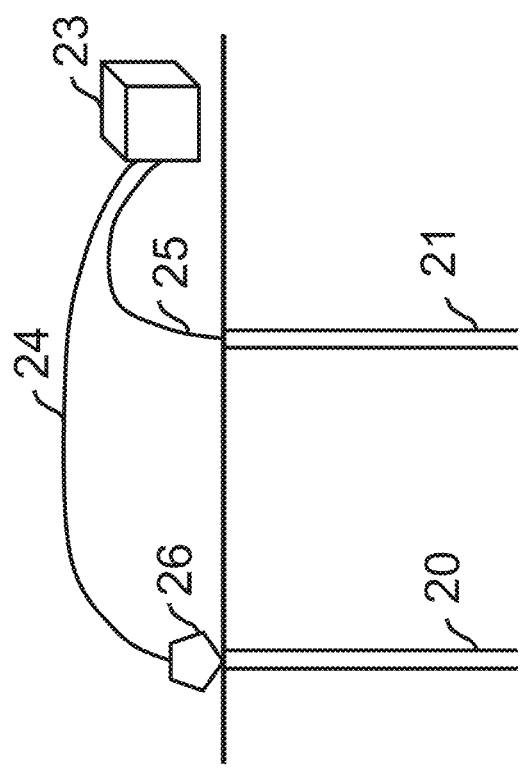

SYSTEM AND METHOD FOR PREVENTING WELLBORE INTERACTIONS

CROSS-REFERENCE TO RELATED APPLICATIONS

This application claims priority from U.S. Provisional Patent Application 62/991,538 filed Mar. 18, 2020.

STATEMENT REGARDING FEDERALLY SPONSORED RESEARCH OR DEVELOPMENT

Not applicable.

TECHNICAL FIELD

The disclosed embodiments relate generally to techniques for preventing wellbore interactions and, in particular, to a method of preventing wellbore interactions by using strain/strain-rate measurements.

BACKGROUND

Completion of wells in the subsurface may include injection of fluids that may cause fracturing in the rock formations surrounding the injection well. Such fracturing may be beneficial for the purpose of extracting (producing) hydrocarbons from the subsurface since the hydrocarbons can flow through the fractures. However, the situation may not be desirable if the fractures from the injection well extend to another well (commonly known as a fracture driven wellbore interaction or a "frack hit"). Conventional methods for preventing wellbore interactions leverage technology such as distributed acoustic sensing (DAS) for strain/strain-rate measurements for a nearby monitoring well during completions. In the conventional methods, the low frequency band of the strain/strain-rate measurement are used for this detection. However, this detection takes too long for real-time intervention to prevent wellbore interactions.

There exists a need for methods to predict and prevent wellbore interactions.

SUMMARY

In accordance with some embodiments, a method of preventing wellbore interactions in wells near an injection well is disclosed. The method includes receiving, at one or more computer processors, fiber optic data; performing object detection by detecting, via the one or more computer processors, object-like events in the fiber optic data; and sending instructions to a hydraulic fracturing system based on the object detection. The fiber optic data is distributed acoustic sensing (DAS) data or distributed strain sensing (DSS) data. The object detection may be performed by template matching, inversion, or a machine-learning method such as one using a convolutional neural network (CNN). The instructions sent to the hydraulic fracturing system may be to reduce injection volume and/or injection rate or to stop injection.

In another aspect of the present invention, to address the aforementioned problems, some embodiments provide a system including a computer. The computer includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 5 is a diagram of a system for preventing wellbore interactions, in accordance with some embodiments.

Like reference numerals refer to corresponding parts throughout the drawings.

DETAILED DESCRIPTION OF EMBODIMENTS

Described below are methods, systems, and computer readable storage media that provide a manner of wellbore interaction prevention by detection of precursor signals and patterns of strain or strain-rate measurements. These embodiments are designed to be of assistance in avoiding causing induced fracturing that reaches wells that are geographically close to the injection well.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention uses the idea that the future stress level in a monitor well (and potential fracture propagation to the monitor well) can be predicted by identifying patterns of stress propagation in time for operational decisions. The system will include pumps that are used to inject the fluids into an injection well that can be stopped when the predicted future stress level indicates that the monitor well may be impacted by an induced fracture.

Figures 1A, 1B:
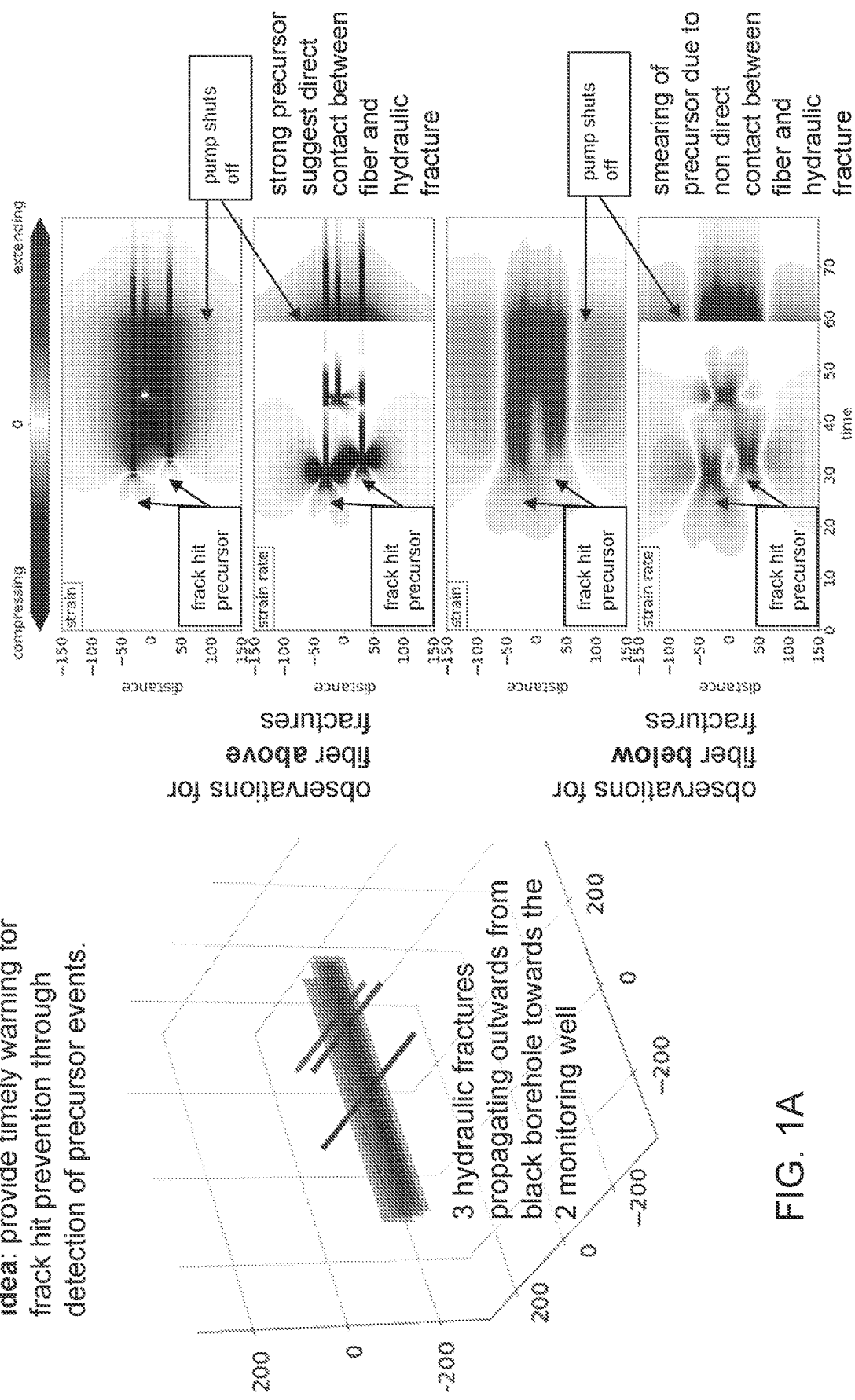
FIG. 1A illustrates a subsurface with an injection well, fractures, and fiber optics cables in other wells.
FIG. 1B illustrates the data recorded by the fiber optics.

The method detects precursor events in data that is recorded by distributed acoustic sensing (DAS) or distributed strain sensing (DSS) in one or more monitor wells near the injection well. The low-frequency DAS or DSS signal contains information that describes the strain field surrounding hydraulic fractures. As shown in FIG. 1A and FIG. 1B, simulations show that the DAS or DSS field recordings during hydraulic fracturing capture the strain field around propagating fractures, highlighting heart-shaped like phenomena as precursor events to fracture tips. The present invention provides a method for detection of such events as an indicator for an imminent fracture hit. Early detection of the precursor event (stress build-up) can provide informed decision to shut pumps in time before fracture arriving to the monitoring well. This object detection may be done by template matching, machine-learning, and/or inversion.

Figure 2:
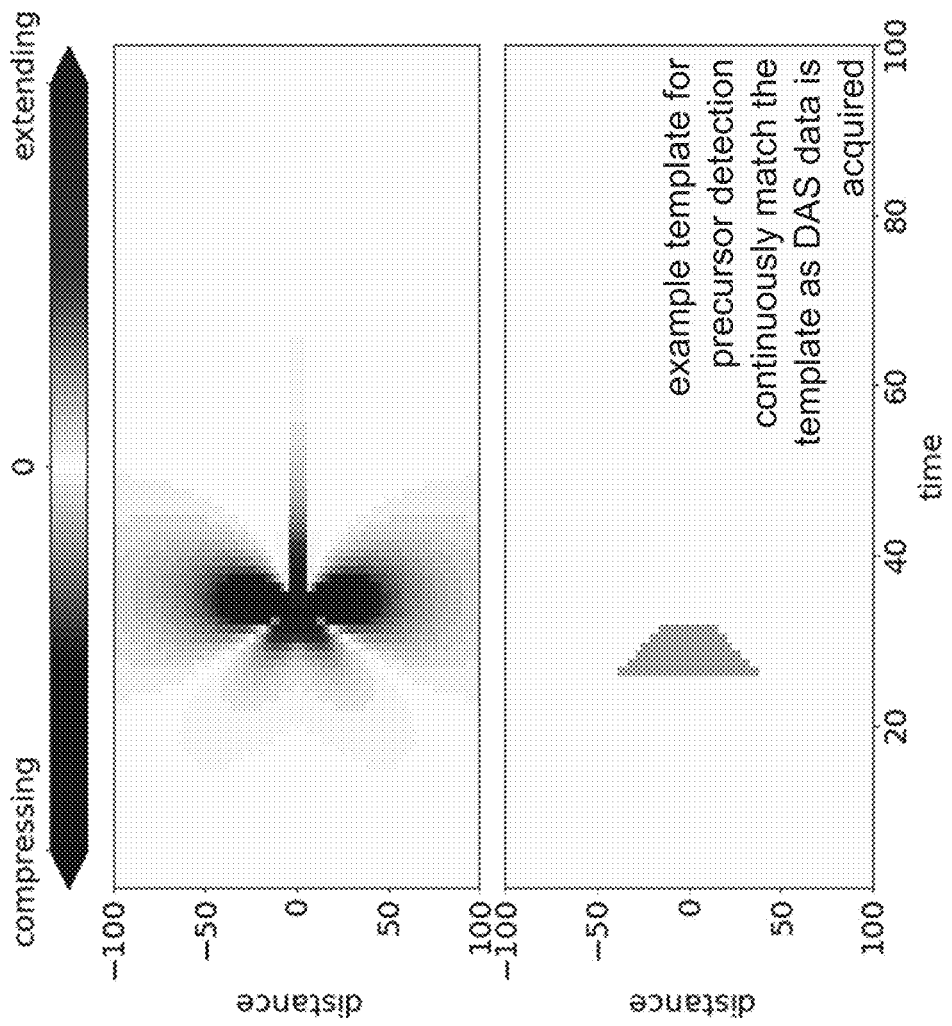
FIG. 2 illustrates steps of a method for preventing wellbore interactions, in accordance with some embodiments.

The top panel of FIG. 2 shows an example of the fiber optics data recorded during and after a wellbore interaction. The lower panel shows an example of a template for precursor detection. This template example is not meant to be limiting; any shape template that emulates the wellbore interaction precursor event can be used. Additionally, rather than having a user-defined template, a machine-learning method may be used to identify a characteristic pattern like a template.

The template matching embodiment uses a cross-correlation between the template and the recorded fiber optics data which is continuously applied as the fiber optics data is acquired. In one embodiment, the method may utilize the fast normalized cross-correlation implementation in Scikit-Image, which is known to those of skill in the art. This embodiment uses a user-specified geometrical template for the cross-correlation process. The method aims to continuously match the proposed template against the low-frequency fiber optics data. Since the tensile stress feature is mainly positive, the highest positive value from the cross-correlation process is selected for the cross-correlation.

Figure 3:
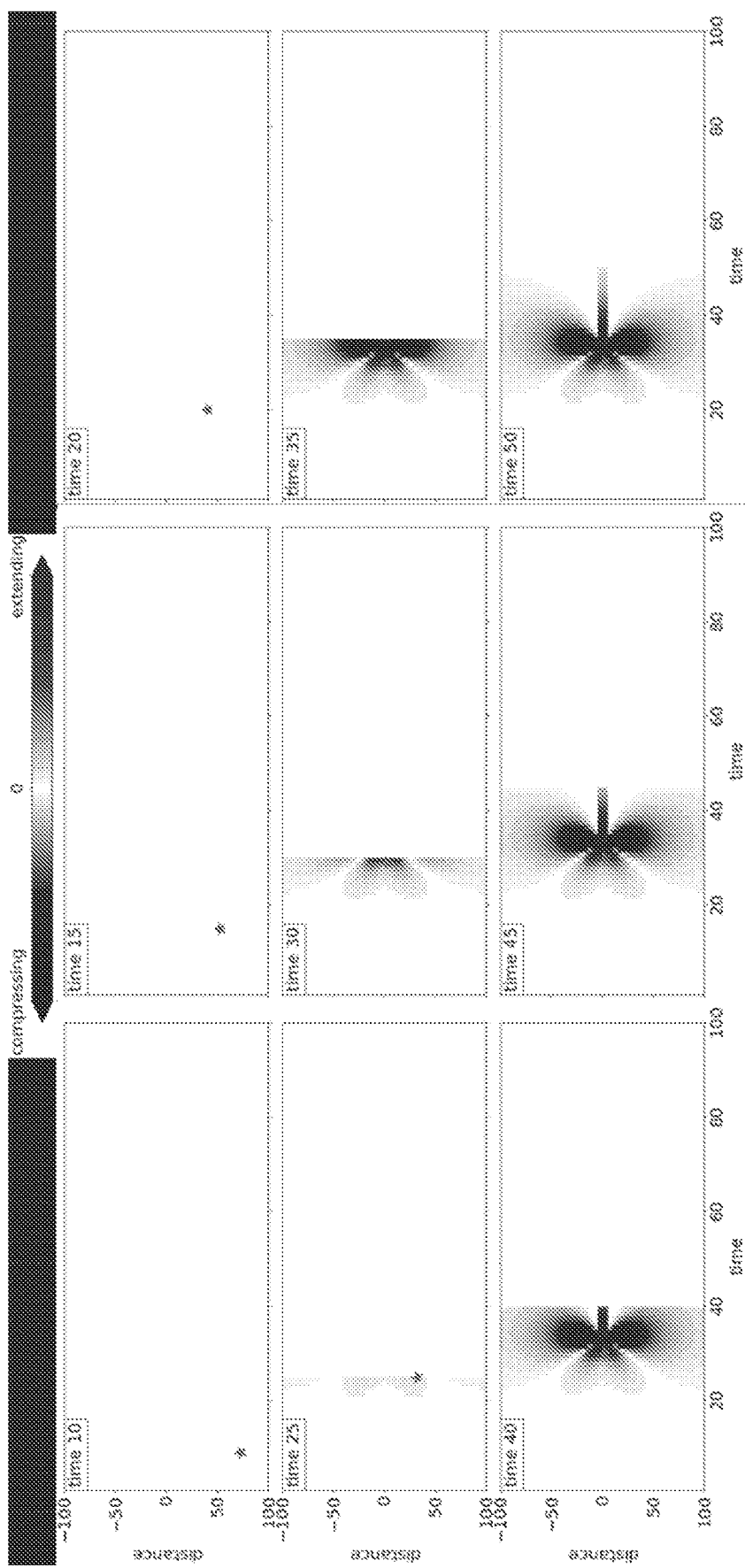
FIG. 3 illustrates steps and results of a method for preventing wellbore interactions, in accordance with some embodiments.

In FIG. 3, the different panels act as different time intervals of a field recording in real-time. The star denotes the maximum positive correlation using the proposed template for the precursor event. At earlier times, the star location may appear random as the entire image shares the likelihood of the precursor event. As the precursor event reveals itself, the star slowly and steadily converges towards the fracture tip location. An example of early warning criteria is to observe such convergence behavior. In practice, the detection system would flag a potential wellbore interaction as early as time 20 in FIG. 3.

In another embodiment, the method performs object detection with machine-learning. Since this invention performs real-time detection of the precursor events, the machine-learning algorithm must be able to process a large number of frames quickly. For example, the you-only-look-once (YOLO) architecture, a convolutional neural network (CNN)-based object detection algorithm may be used. The CNN may be trained on synthetic data, such as shown in FIGS. 1-4, or field data.

Figure 4:
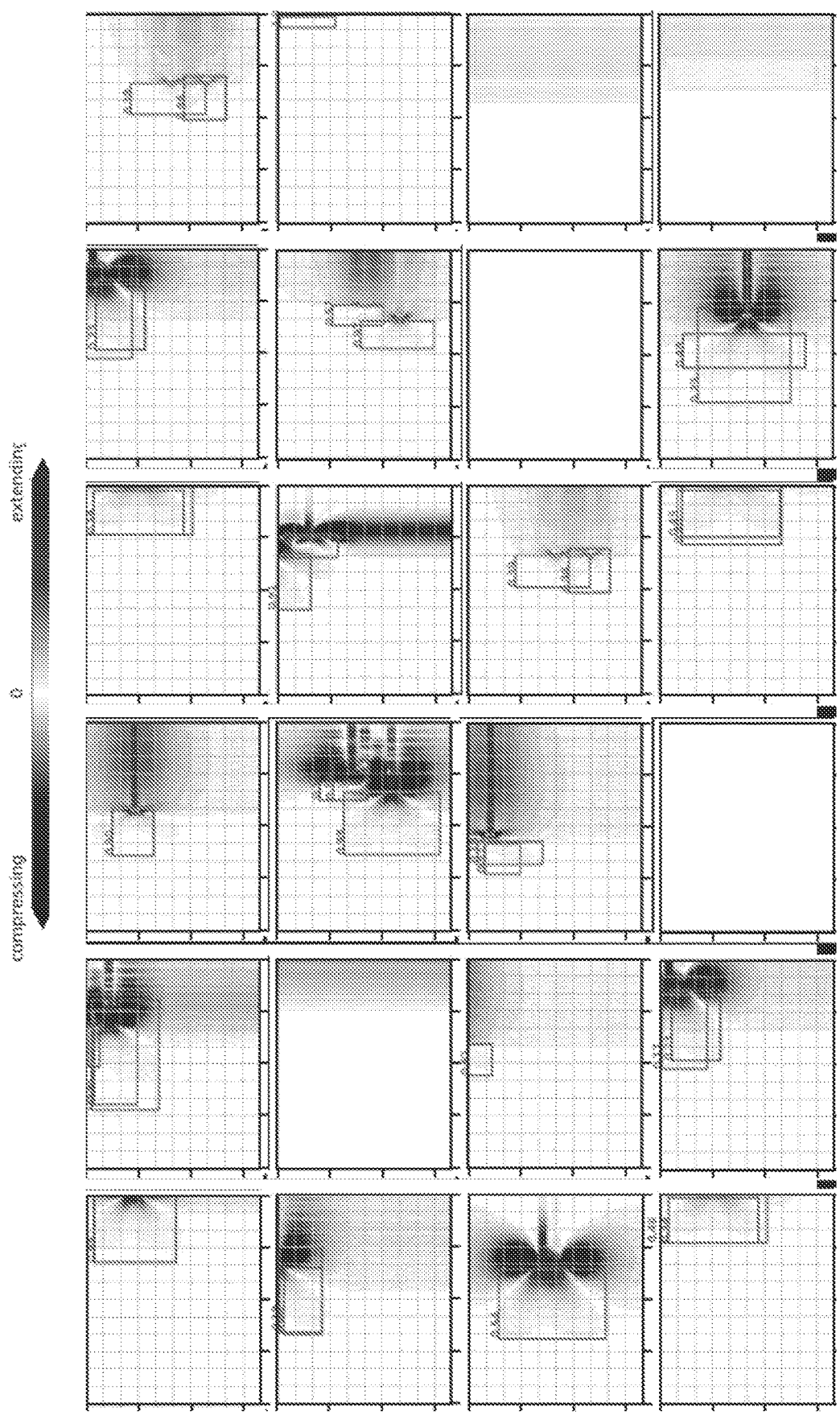
FIG. 4 illustrates steps and results of a method for preventing wellbore interactions, in accordance with some embodiments.

FIG. 4 shows the validation results on synthetic data hidden from the CNN training process. The bounding box together with the confidence score indicates the likely presence of a precursor event. The example of multiple fracture tips is unlikely in practice as first detection would have triggered the warning system. However, this example includes such scenarios to demonstrate the ability to perform multiple detection. Although not applied in the present example, a method of non-max suppression can overcome multiple overlapping boxes on the same detected event.

In yet another embodiment, the object detection may be done by inversion of the fiber optics data. The fracture hit identification inversion process minimizes the misfit between recorded and modelled DAS or DSS responses. The modelled response from an inverted fracture hit location best simulates the field recording response. The individual frames in FIG. 3 simulate field recordings at different snapshots where we invert for a fracture location that best represents the snapshot of interest. In situations where the precursor event is slowly unveiling, the inversion results are given as position along and distance away from the observation well. Once the fracture hit pattern establishes, the inverted spatial distance converges to a static position.

FIG. 5 is a diagram illustrating a hydraulic fracturing system, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

The hydraulic fracturing system includes an injection well 20 with one or more injection pumps 26, at least one monitoring well 21 with seismic sensors deployed in it, and a computer system 23 that receives data from the monitoring well 21 through input line 25 and sends signals to the injection pumps 26 through output line 24. Although injection well 20 and monitoring well(s) 21 appear as vertical wellbores, this is not meant to be limiting. As is know to those of skill in the art, the wellbores may be vertical, deviated, and/or horizontal.

The computer system 23 includes one or more processing units (CPUs), one or more network interfaces and/or other communications interfaces, memory, and one or more communication buses for interconnecting these and various other components. The computer system 23 also includes a user interface (e.g., a display and an input device). The communication buses may include circuitry (sometimes called a chipset) that interconnects and controls communications between system components. Memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory may optionally include one or more storage devices remotely located from the CPUs. Memory, including the non-volatile and volatile memory devices within memory, comprises a non-transitory computer readable storage medium and may store data or data products.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for preventing wellbore interactions between wells in the earth's subsurface that does not use fracture modeling, comprising:
    a. receiving, at one or more computer processors, fiber optics data from a monitoring well during hydraulic fracturing using a hydraulic fracturing system;
    b. during the hydraulic fracturing, predicting a future stress level in the monitor well indicative of a potential fracture propagation to the monitor well by performing object detection by detecting, via the one or more computer processors, object-like events in the fiber optics data indicative of the potential fracture propagation to the monitor well; and
    c. in real time, when the predicted future stress level indicates that the monitor well may be impacted by an induced fracture, sending instructions to the hydraulic fracturing system to reduce at least one of injection volume or injection, or to stop injection.

2. The method of claim 1 wherein the fiber optics data is distributed acoustic sensing (DAS) data or distributed strain sensing (DSS) data.

3. The method of claim 1 wherein the object detection is performed by template matching.

4. The method of claim 1 wherein the object detection is performed by a machine-learning method.

5. The method of claim 4 wherein the machine-learning method uses a convolutional neural network (CNN).

6. The method of claim 5 wherein the CNN is a you-only-look-once (YOLO) CNN.

7. The method of claim 1 wherein the object detection is performed by inversion of the fiber optics data.

8. A computer system for preventing wellbore interactions between wells in the earth's subsurface that does not use fracture modeling, comprising:
    one or more processors;
    memory; and
    one or more programs, wherein the one or more programs are stored in the memory and configured to be executed by the one or more processors, the one or more programs including instructions that when executed by the one or more processors cause the system to:
        a. receive, at one or more processors, fiber optics data from a monitoring well during hydraulic fracturing using a hydraulic fracturing system;
        b. during the hydraulic fracturing, predict a future stress level in the monitor well indicative of a potential fracture propagation to the monitor well by detecting, via the one or more processors, object-like events in the fiber optics data indicative of the potential fracture propagation to the monitor well; and
        c. in real time, when the predicted future stress level indicates that the monitor well may be impacted by an induced fracture, send instructions to the hydraulic fracturing system to reduce at least one of injection volume or injection, or to stop injection.

9. The system of claim 8 wherein the fiber optics data is distributed acoustic sensing (DAS) data or distributed strain sensing (DSS) data.

10. The system of claim 8 wherein the object detection is performed by template matching.

11. The system of claim 8 wherein the object detection is performed by a machine-learning method.

12. The system of claim 11 wherein the machine-learning method uses a convolutional neural network (CNN).

13. The system of claim 12 wherein the CNN is a you-only-look-once (YOLO) CNN.

14. The system of claim 8 wherein the object detection is performed by inversion of the fiber optics data.

* * * * *